United States Patent

[11] 3,619,364

| [72] | Inventor | Peter Heinrich Erwin Margen<br>Roslags-Nasby, Sweden |
|---|---|---|
| [21] | Appl. No. | 720,690 |
| [22] | Filed | Apr. 11, 1968 |
| [45] | Patented | Nov. 9, 1971 |
| [73] | Assignee | Aktiebolaget Atomenergi<br>Stockholm, Sweden |
| [32] | Priority | Apr. 12, 1967 |
| [33] | | Sweden |
| [31] | | 5121/67 |

[54] NUCLEAR REACTOR IN WHICH THE COOLANT IS BOILING LIGHT WATER
1 Claim, 6 Drawing Figs.

[52] U.S. Cl. .................................................. 176/31,
176/54, 176/68
[51] Int. Cl. ......................................................... G21c 19/22
[50] Field of Search ........................................... 176/30–32,
54–56, 68, 43

[56] References Cited
UNITED STATES PATENTS

| 2,936,273 | 5/1960 | Untermyer ................... | 176/56 |
| 3,041,264 | 6/1962 | Ricard .......................... | 176/54 |
| 3,070,537 | 12/1962 | Treshow ....................... | 176/54 UX |
| 3,372,092 | 3/1968 | Margen ........................ | 176/54 X |

FOREIGN PATENTS

| 1,082,992 | 6/1960 | Germany ..................... | 176/54 |

Primary Examiner—Carl D. Quarforth
Assistant Examiner—Harvey E. Behrend
Attorney—Pierce, Scheffler & Parker ABSTRACT: In a nuclear reactor of the boiling light water type the steam-water mixture produced in the fuel cartridges is passed through steam-water separators in which the steam is separated from the water. According to an improved embodiment a fuel cartridge is united with a steam-water separator to form a unit. Said unit can be lifted by a refueling machine, so as to be inserted into and removed from the reactor through a refueling tube.

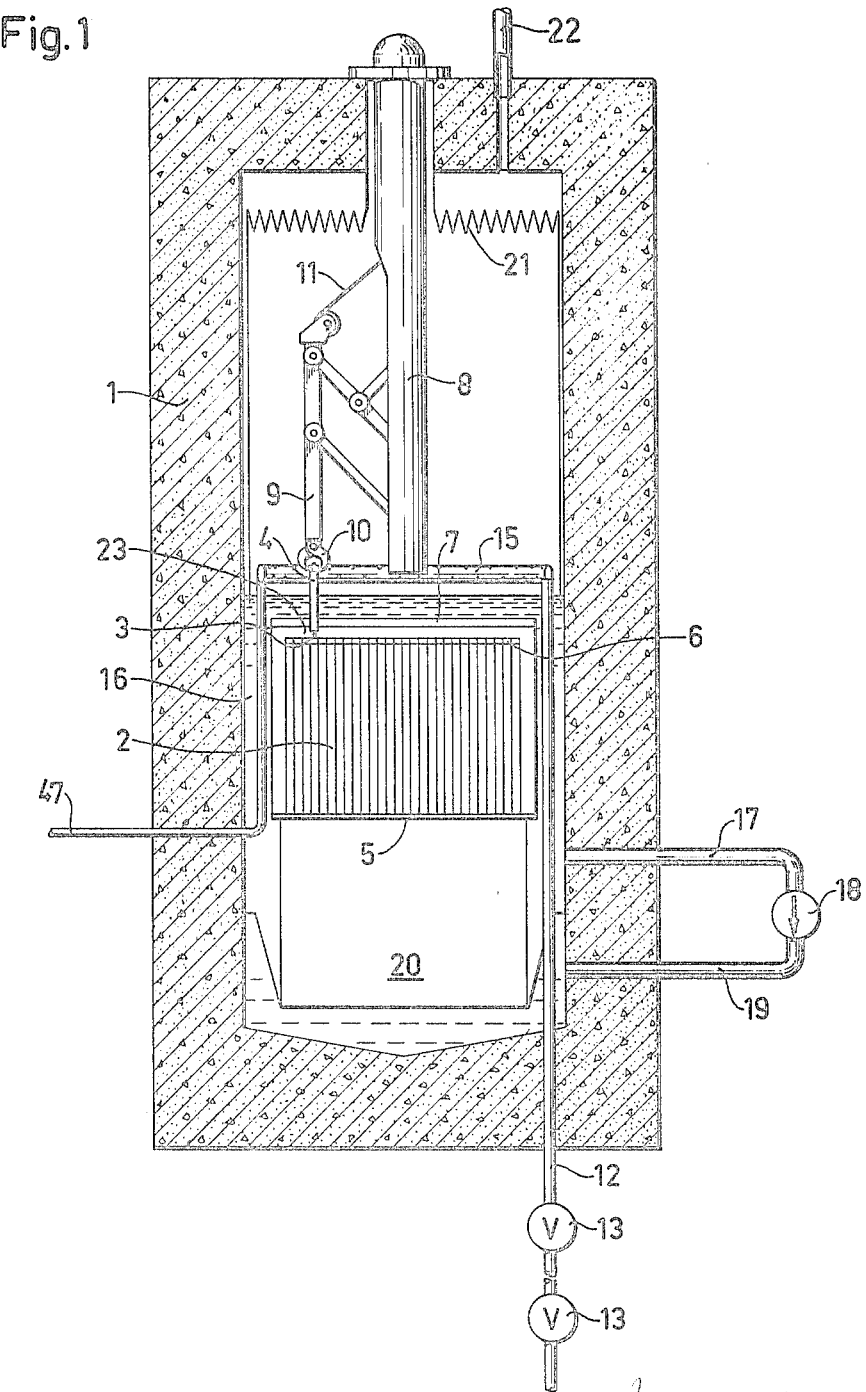

PATENTED NOV 9 1971 3,619,364
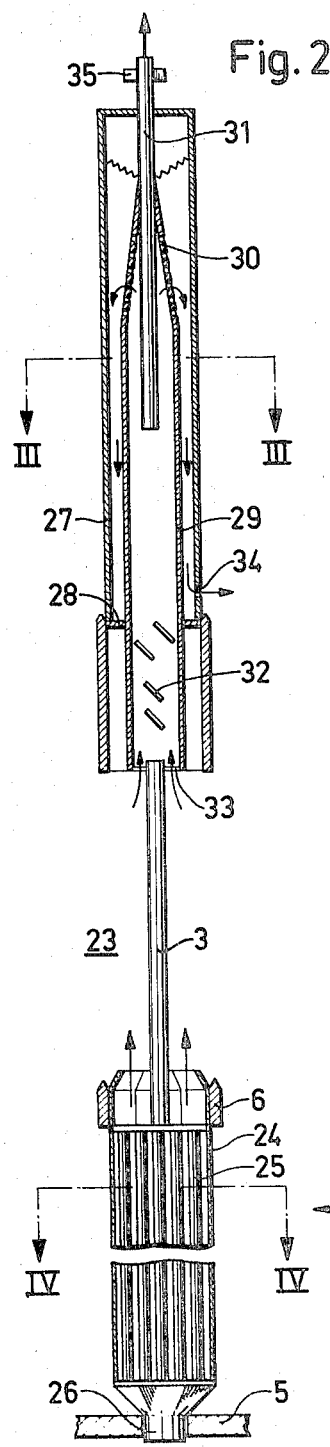
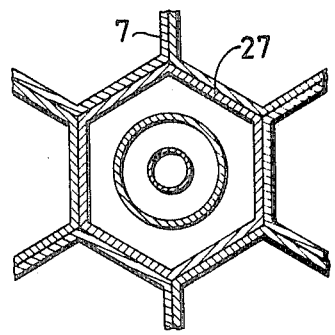
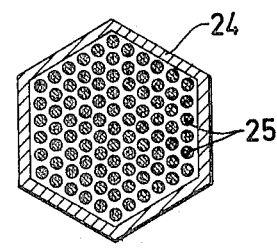

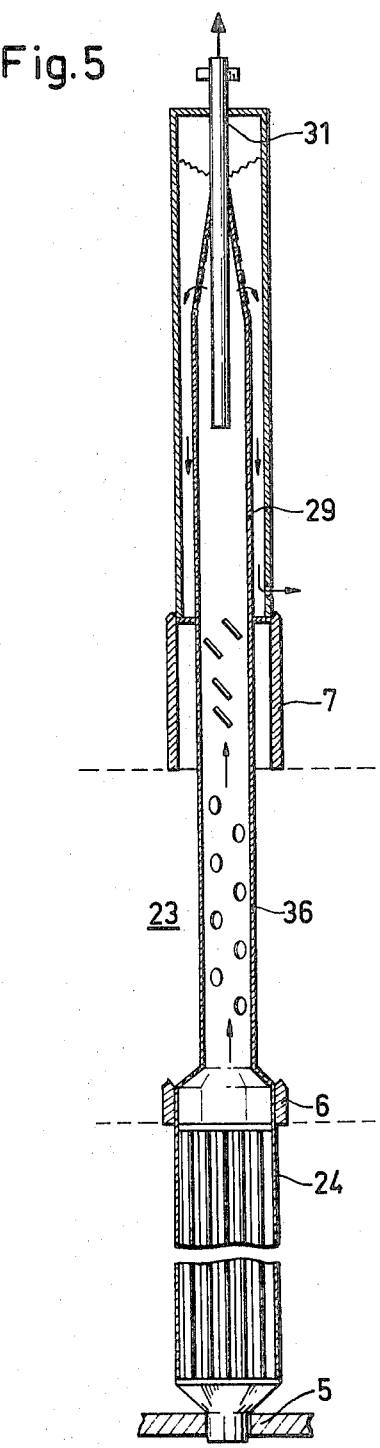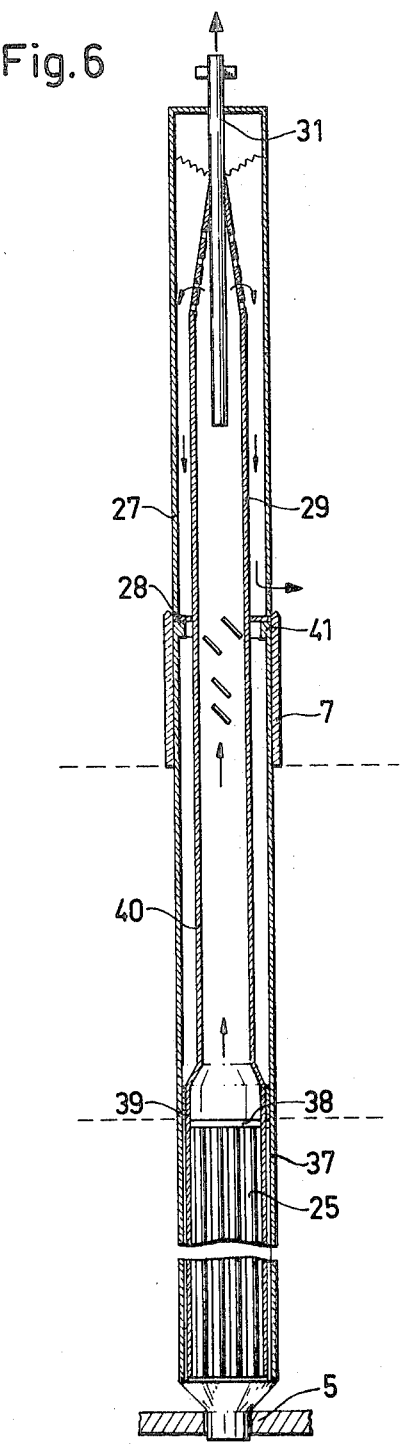

NUCLEAR REACTOR IN WHICH THE COOLANT IS BOILING LIGHT WATER

The invention is concerned with a nuclear reactor in which the coolant is boiling light water, and more particularly a nuclear reactor comprising a pressure vessel, in said pressure vessel a reactor core containing fuel cartridges containing fissile fuel, means for the supply of light water to the pressure vessel and for passing the water through the fuel cartridges while boiling, steam separators for separating the steam from accompanying water, a refueling channel extending into the pressure vessel, and a refueling machine in the pressure vessel for withdrawing used fuel cartridges from the pressure vessel through said refueling channel and for inserting new fuel cartridges into the pressure vessel through said refueling channel.

In known light water nuclear reactors the fuel cartridges are situated close to each other. They are surrounded by casings, a casing and a cartridge forming one unit. When the fuel cartridges are to be changed the lid of the vessel is lifted, the cartridges are removed by means of a refueling machine, and new cartridges are inserted. This operation usually requires a time of several weeks. Therefore, the reactor is usually refueled only once a year, for instance in the summer when the power demand is below the normal value. Nevertheless, the costs for taking the reactor out of operation are considerable, and the fact that the reactor can be refueled only once a year requires a higher degree of enrichment of the nuclear fuel, thus resulting in higher fuel costs.

It is the main object of the invention to provide a reactor which can be refueled with only a short stop of operation, or without being taken out of operation at all. It is another object of the invention to provide a reactor containing a pressure vessel consisting of prestressed concrete and having no removable lid.

The nuclear reactor of the invention is characterized in that each fuel cartridge is united with a steam separator to form a unit, and that the steam separator has means for engaging the refueling machine so as to be lifted, together with the fuel cartridge, by the refueling machine. The fact that a fuel cartridge and a steam separator is handled as one unit by the refueling machine makes it possible to move the fuel cartridges into and out of the reactor without being obstructed by the steam separators.

In a nuclear reactor of this type the quantity of steam and water originating from a fuel cartridge in a central position is usually larger than that originating from a fuel cartridge in a peripheral position. The effectiveness of the steam separators is reduced when the quantity of coolant increases. Therefore, it is desired that all steam separators receive the same quantity of coolant. According to one embodiment of the invention the steam separator is united with the fuel cartridge by means of a rod or a perforated tube, permitting the water and the steam originating from the fuel cartridge to flow in the transverse direction. This transverse flow results in such a distribution that the steam separators receive approximately equal quantities of coolant.

The invention will now be described with reference to the accompanying drawings. FIG. 1 illustrates a nuclear reactor of the invention. FIG. 2 illustrates a fuel cartridge and the corresponding steam separator. FIGS. 3 and 4 illustrate cross sections on the lines III—III and IV—IV of FIG. 2. FIGS. 5 and 6 illustrate embodiments which are alternative to that of FIG. 2.

The reactor of FIG. 1 contains a pressure vessel 1 of prestressed concrete. The pressure vessel contains nuclear fuel in the form of fuel cartridges 2 having a hexagonal cross section. The cartridges are situated so close to each other that the space between adjacent cartridges only permits thin plate-shaped neutron-absorbing control rods (not illustrated) to be inserted between the cartridges. The top of each fuel cartridge 2 is united by means of a rod 3 with a steam separator 4. The fuel cartridges and the steam separators are fixed in the desired position by means of a plate 5 having openings to receive the bottom of the cartridges, a first grating 6 providing a lateral support for the top of the fuel cartridges, and a second grating 7 providing a lateral support for the steam separators 4.

The upper portion of the pressure vessel contains a refueling machine 8 having a vertical arm 9 which can be placed above each fuel cartridge. The arm 9 supports a lifting member 10 which can be lifted and lowered by means of a wire 11. In the refueling operation the lifting member 10 seizes the top of a steam separator 4, the steam separator and the fuel cartridge united therewith are lifted out of the reactor core and are lowered through a refueling tube 12 extending through the bottom of the pressure vessel. The refueling tube is provided with double valves 13. New fuel cartridges, having steam separators united therewith, are inserted into the reactor in a similar way.

Feed water, i.e. ordinary light water, is supplied to the reactor through a tube 7 and is distributed in the reactor through an annular perforated tube 15. The water flows down in the annular space 16 close to the inner wall of the pressure vessel 1, flows through a tube 17 to a pump 18 and is pumped back through a tube 19 to the bottom portion 20 of the reactor, and subsequently flows into the fuel cartridges 2. The steam-water mixture produced in the fuel cartridges enters into the space 23, and flows from said space into the steam separators 4. The steam flows up through a steam drier 21 in which water drops accompanying the steam are removed, and the dry steam leaves the reactor through a tube 22.

FIGS. 2–4 illustrate a fuel cartridge 2 consisting of an outer tube 24 having a hexagonal cross section, containing a plurality of fuel rods 25. The bottom of the cartridge is provided with a tubular portion 26 having a reduced diameter. Said bottom portion 26 engages an opening in the plate 5 supporting the fuel cartridges. The top of the tube 24 is fixed in the transverse direction by the grating 6 which has hexagonal openings. The top of the tube 24 is fastened to a rod 3. The top of the rod 3 is fastened, by means of spokes 33, to a tube 29 having a circular cross section. The tube 29 forms part of the steam separator 4. The tube 29 contains a plurality of inclined baffle plates 32 which impart a rotary motion to the steam-water mixture flowing up through the separator. The top of the tube 29 is provided with a narrowing perforated portion 30. The steam leaves the steam separator through a tube 31 which is fastened to said perforated top portion 30. The tube 29 is situated inside a tube 27 having a hexagonal cross section. The bottom 28 of the tube 27 is fastened to the tube 29. The bottom 28 forms a wall between the grating 7 and the tube 29, resulting in the whole quantity of steam and water flowing up through the tube 29. The water flows through the openings of the perforated portion 30, flows down in the space between the tubes 27 and 29, and leaves the steam separator through openings 34. The central tube 31 has shoulders 35 on its top, for engaging the lifting member 10 of the refueling machine.

FIG. 5 illustrates a modified embodiment of the fuel cartridge and the steam separator. Similar reference characters are used for parts corresponding to those of FIG. 2. According to FIG. 5 the top of the outer tube 24 of the fuel cartridge is united with a perforated tube 36, the upper portion of which constitutes the tube 29. The openings of the tube 36 makes it possible for the steam and the water to flow transversely in the space 23.

FIG. 6 illustrates another modified embodiment. Similar reference characters are used. The tube 37, which surrounds the fuel rods 25 and which has a hexagonal cross section, is arranged to remain in the reactor during the refueling operation. Said tube 37 extends up to the top of the grating 7. The tube 37 has a thickened top portion 41. The top of the fuel rods 25 is fastened to a perforated plate 38. This plate is fastened to a tube consisting of a lower portion 39 having a hexagonal cross section and an upper portion 40 having a circular cross section. The top portion of the tube 40 constitutes the tube 39. The bottom 28 of the outer tube 27 of the steam separator is supported by the thickened portion 41 of the tube 37. In the refueling operation the fuel rods 25 will be lifted up through the stationary tube 37. This stationary tube 37 makes it possible for the coolant to flow in a forced flow between the fuel rods 25 during the first part of the lifting operation. When the refueling operation takes place during the normal operation of the reactor, it is important that the fuel rods are effectively cooled during this first part of the lifting operation.

What is claimed is:

1. A nuclear reactor, comprising a pressure vessel;

in said pressure vessel a reactor core containing at least one fuel cartridge containing fissile fuel;

means for supplying light water to the pressure vessel and for passing the water through each said fuel cartridge while boiling;

at least one steam separator for separating steam from accompanying water; each said fuel cartridge being coupled as a unit with a steam separator by means of a coupling member, said steam separator being spaced a predetermined distance above said core by said coupling member, said coupling member having means within the space between the fuel cartridge and the steam separator to allow within said space a transverse flow of water and steam originating from the fuel cartridge;

a refueling channel extending into the pressure vessel;

a refueling machine in the pressure vessel for withdrawing a used fuel cartridge from the pressure vessel through said refueling channel and for inserting a new fuel cartridge into the pressure vessel through said refueling channel; each said steam separator having means for engagement with the refueling machine so as to be lifted, together with the fuel cartridge as a unit, by the refueling machine.

* * * * *